United States Patent
Hsu

(10) Patent No.: US 10,520,989 B1
(45) Date of Patent: Dec. 31, 2019

(54) HINGE DEVICE

(71) Applicant: Jarllytec Co., Ltd, New Taipei (TW)

(72) Inventor: Yu-Tsun Hsu, New Taipei (TW)

(73) Assignee: JARLLYTEC CO., LTD., New Taipei (TW)

( * ) Notice: Subject to any disclaimer, the term of this patent is extended or adjusted under 35 U.S.C. 154(b) by 0 days.

(21) Appl. No.: 16/231,796

(22) Filed: Dec. 24, 2018

(30) Foreign Application Priority Data

Jun. 21, 2018 (TW) .............................. 107121383 A

(51) Int. Cl.
*G06F 1/16* (2006.01)

(52) U.S. Cl.
CPC .......... *G06F 1/1681* (2013.01); *G06F 1/1641* (2013.01); *G06F 1/1652* (2013.01); *E05Y 2900/606* (2013.01)

(58) Field of Classification Search
CPC .... G06F 1/1681; G06F 1/1641; G06F 1/1652; G06F 1/1616; G06F 1/1683; E05Y 2900/606; H04M 1/0216; H04M 1/0214; H04M 1/0222; Y10T 16/53625; Y10T 16/536; Y10T 16/535; Y10T 16/538; Y10T 16/542; E05D 1/06; E05D 7/10; E05D 7/00; H05K 1/028; H05K 1/189; H05K 2201/2027
USPC ..... 16/269, 260, 254, 277, 355; 379/433.13; 455/575.3; 361/679.27; 439/31, 165
See application file for complete search history.

(56) References Cited

U.S. PATENT DOCUMENTS

| 8,804,324 | B2 * | 8/2014 | Bohn ................... G06F 1/1616 345/1.1 |
| 9,250,733 | B2 | 2/2016 | Lee et al. |
| 9,348,450 | B1 | 5/2016 | Kim |
| 9,910,458 | B2 * | 3/2018 | Watanabe ................ G09F 9/00 |
| 10,082,827 | B2 * | 9/2018 | Yamauchi ............. G06F 1/1616 |

(Continued)

FOREIGN PATENT DOCUMENTS

CN 106205385 A 12/2016

*Primary Examiner* — William L Miller
(74) *Attorney, Agent, or Firm* — Muncy, Geissler, Olds & Lowe, P.C.

(57) ABSTRACT

The present invention provides a hinge device, comprising two rotating members and two movable plates. Each of the rotating members includes a hinge portion and seat body, and each hinge portion has a curved guiding channel and a restoring member, and each hinge portion shares a rotating center so as to be rotated with each other, thereby the first and second rotating members are folded or unfolded. A first movable plate and a second movable plate is symmetrically provided, and each plate leg is guided into the corresponding seat body and the arc segment of each plate leg is located in each curved guiding channel to be moved, and the free end of each plate leg is contacted with each restoring member. When being unfolded, each movable plate is respectively lifted up to be aligned with each other by each hinge portion, and each restoring members is respectively pushed by the respective plate leg to accumulate force. When being unfolded, the hinge portion of each rotating member is respectively separated from each movable plate to release each restoring member to push the respective plate leg to move respectively, causing each movable plate to be unfolded and forms an accommodation space there between.

17 Claims, 15 Drawing Sheets

(56) References Cited

U.S. PATENT DOCUMENTS

| | | | | |
|---|---|---|---|---|
| 10,104,790 | B2* | 10/2018 | Lee | E05D 11/0054 |
| 2012/0044620 | A1* | 2/2012 | Song | G06F 1/1616 |
| | | | | 361/679.01 |
| 2012/0314399 | A1* | 12/2012 | Bohn | G06F 1/1616 |
| | | | | 362/97.1 |
| 2014/0042293 | A1* | 2/2014 | Mok | G06F 1/1652 |
| | | | | 248/682 |
| 2014/0111954 | A1* | 4/2014 | Lee | G06F 1/1641 |
| | | | | 361/749 |
| 2014/0293534 | A1* | 10/2014 | Siddiqui | E05D 7/00 |
| | | | | 361/679.55 |

\* cited by examiner

HINGE DEVICE

FIELD OF THE INVENTION

The present invention relates to a hinge device, and more particularly to a hinge device, which is mounted on a foldable electronic device that can be unfolded or folded and includes the hinge device and two bodies connected to opposite two sides of the hinge device, to be used in conjunction with a flexible display device.

BACKGROUND OF THE INVENTION

Due to the flexible display device developed in recent years, it can be used with foldable handheld electronic device; thereby various industries are interested in investing in making it a project to produce these kinds of products. For example, a Chinese Patent entitled with "Foldable display apparatus" of China Patent Application Publication No. CN106205385A (published on Dec. 7, 2016, hereinafter referred to as Patent Document 1, also disclosed in U.S. Pat. No. 9,348,450 B1) has disclosed structure including a flexible display panel, a first support member, a second support member, a first rotating plate and a second rotating plate. The flexible display panel includes a first and a second display areas and a bending display area between the two display areas, such that the first and second support members are respectively under the two display areas, and respectively extend below a first and a second portions of the bending display area. Moreover, the first and second rotating plates are further configured to rotate respectively around first and second axes that are parallel to each other respectively, and to extend toward the edge of the first and second support members. Thus, when the foldable display device is unfolded, the two portions of the bending display area are respectively supported by the two supporting members, and the edges of the two supporting members are spaced from each other in a predetermined distance below the bending display area. The two rotating plates support parts of the two supporting members, and the bending display area is bent with a predetermined curvature by the combination of the two rotating plates.

Moreover, USA Patent entitled with "Hinge device and foldable display apparatus have the same" of the U.S. Pat. No. 9,250,733B (published on Feb. 2, 2016, hereinafter referred to as Patent Document 2) has disclosed that the hinge device includes the first body, the second body, the hinge member, the first support and the second support. The first and second bodies are respectively provided on a first portion and a second portion that support a flexible display panel, and the hinge member can be in hinge connection with the two bodies to each other in a foldable manner, and the first and second supports are respectively pivotally attached their respective ends to the first and second bodies, and make the other end of the two supports to be a free end portion; wherein the two supports are respectively provided on the top side of the two bodies in a swinging manner, together with the hinge device to form an accommodation space. Therefore, when the two bodies are folded, the flexible display panel is folded such that its two portions face to each other, and the flexible display panel has a folded portion with a curvature so as to be extended into the accommodating space; or when the two bodies are unfolded, the two supports are together with the hinge device for supporting the first, second portions and the folded portion of the flexible display panel, and these three portions are supported on the same plane.

However, in the Patent Documents 1 and 2, the respective one end of the two rotating plates/supports are provided in a pivotal manner. Since the center of rotation is the pivoting axis, it is the basis for the rotation of the two rotating plates/supports, which is not easy to make a modification. As a result, the overall thickness is easily limited by the diameter of the components such as the shaft, the pin . . . etc, and it is not easy to reduce the overall thickness of such components. Secondly, the first and second hinge members disclosed in Patent Document 1 or the first hinge projection and second hinge projection disclosed in Patent Document 2 belong to the "two-axes shaft/hinges" and respectively have two rotating centers, such that a certain distance between the two axes is required to be maintained for the other structures in the two-axes shaft/hinges, such as the toothed structures disclosed in the figures of Patent Documents 1 and 2, so as to move. Therefore, in addition to the fact that it is not easy to reduce the overall size, when the foldable display devices of Patent Documents 1 and 2 are folded, it is difficult for the curved area/folded portion of the flexible display panel (hereinafter referred to as "flexible display device") to have a smaller curved curvature.

In view of this, how to reduce the overall thickness, reduce the influence produced from the size of other components and produce a smaller curvature of the curved portion of the flexible display device, which are technical problems to be solved by the present invention.

SUMMARY OF THE INVENTION

The object of the present invention is to provide a hinge device by means of the arc plate leg of the movable plate together with the curved guiding channel inside the rotating member so as to reduce the components and overall assembly processes to reduce overall thickness, which can replace the conventional pivoting connection between the end portions having the rotating plate/support. In addition, when the foldable electronic device is folded, the curved portion of the flexible display device would have a smaller curvature by using three semi-circular/arched rotating members that share the same external rotating center to replace the conventional two-axes rotating shaft/hinge. Moreover, when the folding electronic device is unfolded, the flexible display device is unfolded by matching the movable plates with the shaft portions of the rotating members.

In order to fulfill above purpose, the present invention provides a hinge device, comprising a first rotating member, a second rotating member, a first movable plate and a second movable plate. The first rotating member, comprising a first hinge portion and a first seat body provided with a first curved guiding channel and a first restoring member. The second rotating member comprises a second hinge portion and a second seat body, wherein the second hinge portion and the first hinge portion share a rotating center so as to be rotated with each other, thereby the first and second rotating members are folded or unfolded, wherein a second curved guiding channel and a second restoring member are provided in the second seat body. The first movable plate and the second movable plate that are symmetrically provided, where the first movable plate and the second movable plate are respectively provided with a first plate leg and a second plate leg, each of the first and second plate legs has a arc segment and has one end as a free end; wherein the free end of the first plate leg is guided into the first seat body to be contacted with the first restoring member, and the arc segment of the first plate leg is located in the first curved guiding channel to be moved; the free end of the second plate leg is guided into the second seat body to be contacted with the second restoring member, and the arc segment of the second plate leg is located in the second curved guiding channel to be moved. Thereby, when being unfolded, the two movable plates are respectively lifted up to be aligned with each other by the second hinge portion and the first hinge portion, and the two restoring members are respectively pushed by the respective plate legs to accumulate force; when being unfolded the hinge portions of the two rotating members are respectively separated from the two movable plates to release the two restoring members to push the two plate legs to move respectively, causing the two movable plates to be unfolded and form an accommodation space there between.

The present invention will be understood more fully by reference to the detailed description of the drawings and the preferred embodiments below.

DETAILED DESCRIPTIONS OF PREFERRED EMBODIMENTS

Figure 1:
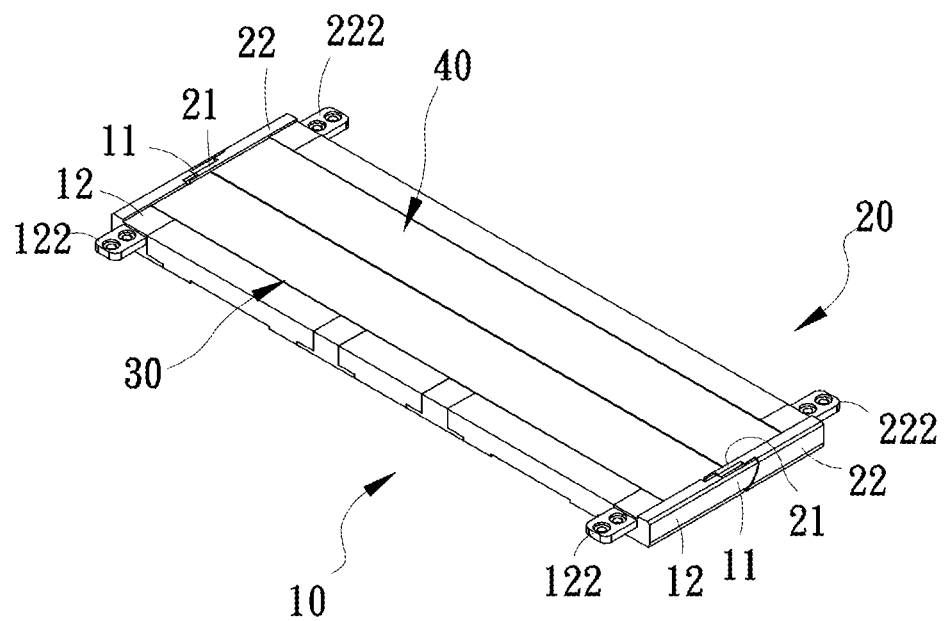
FIG. 1 is a perspective view showing the hinge device of the present invention is unfolded.
Figure 2:
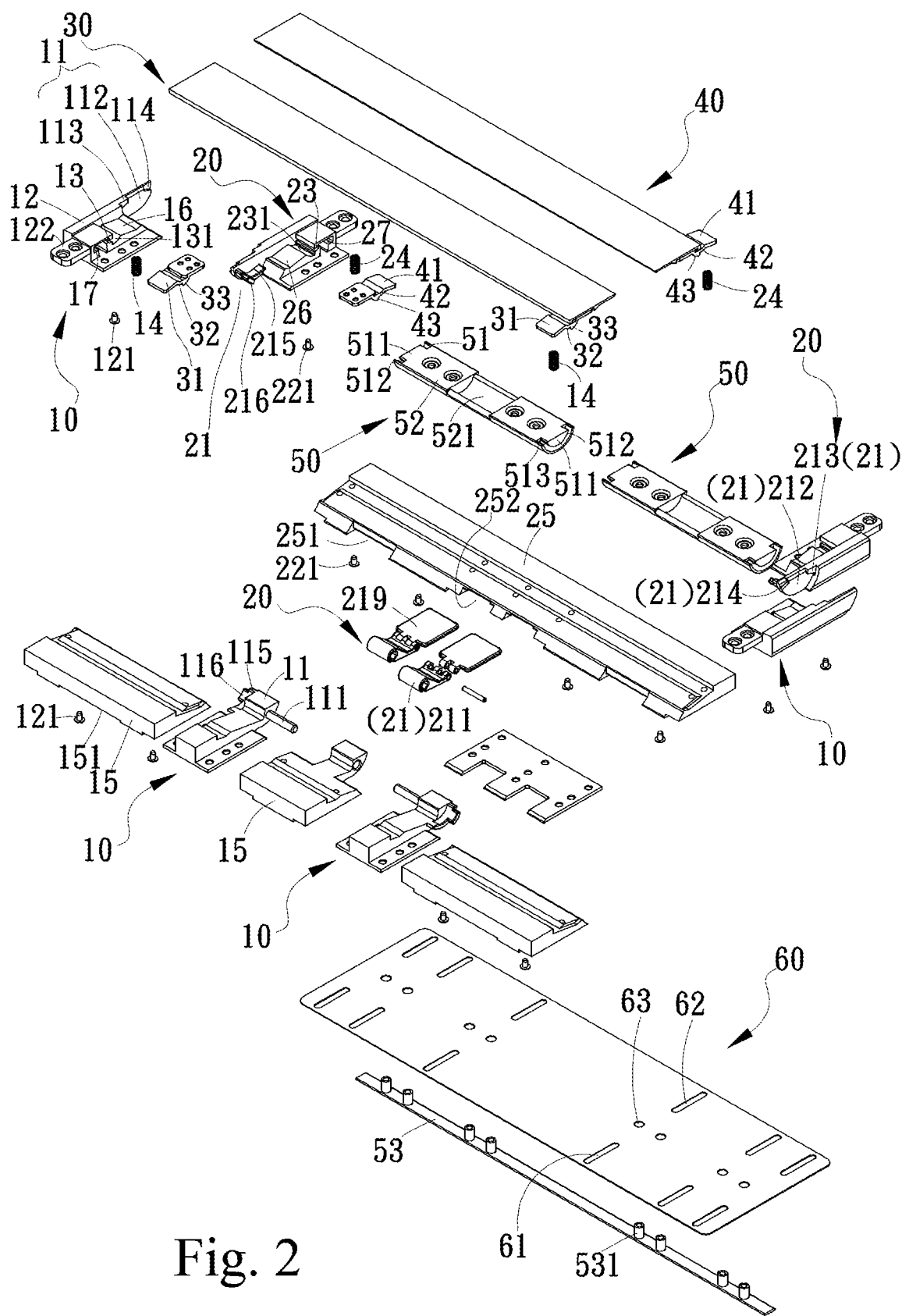
FIG. 2 is an exploded perspective view showing the hinge device of the present invention.
Figure 3:
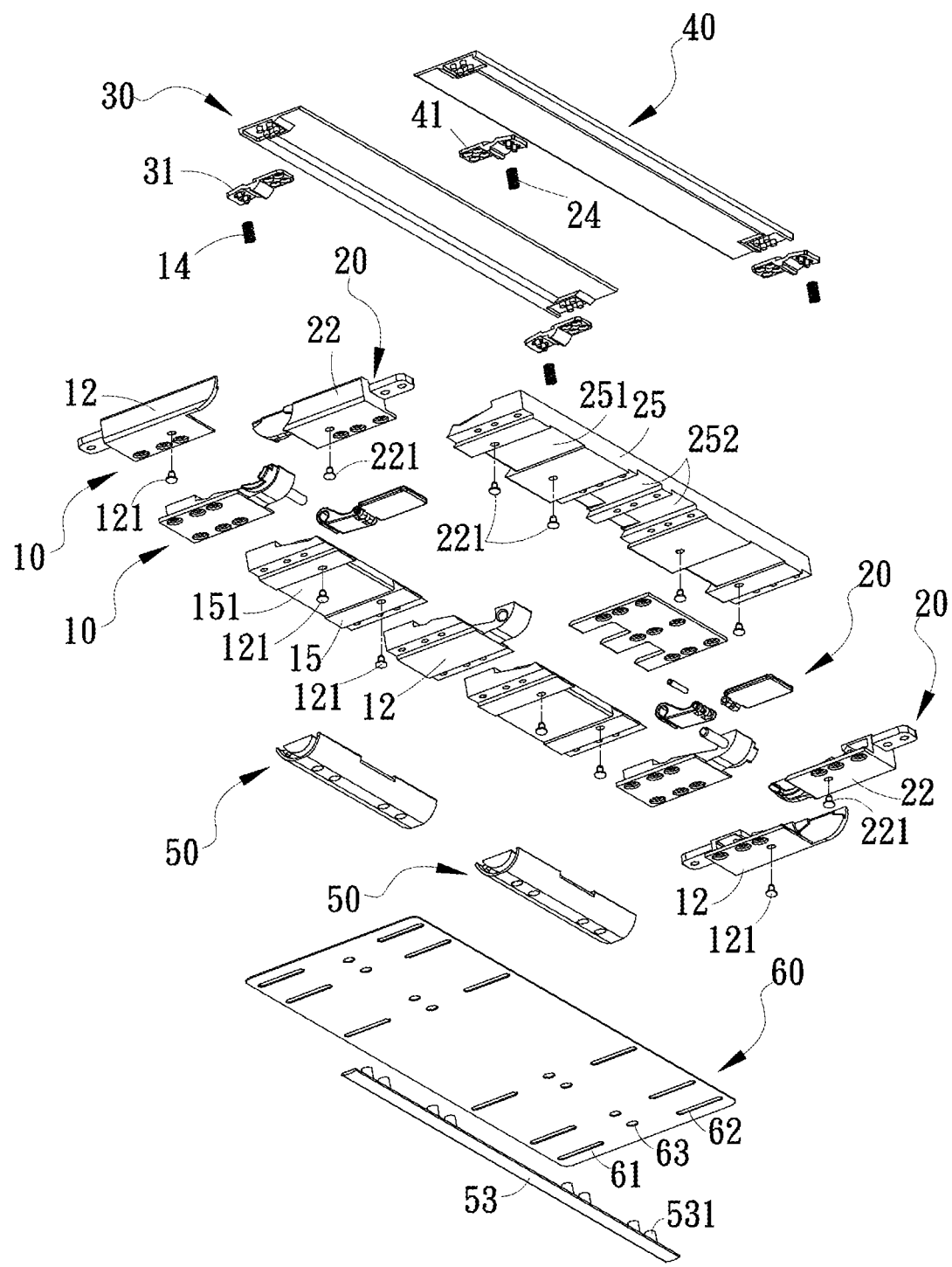
FIG. 3 is an exploded perspective view from another perspective showing the hinge device of the present invention.
Figure 4:
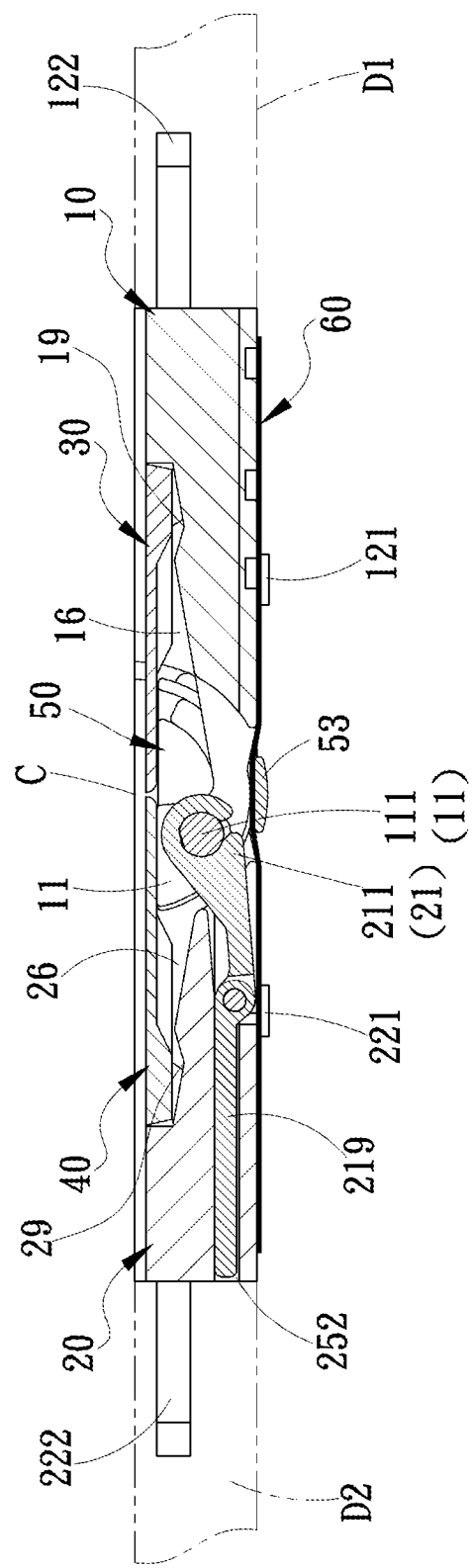
FIG. 4 is a cross-sectional view showing a portion in the hinge device of the present invention assisting rotation and providing torsion when being unfolded.
Figure 5:
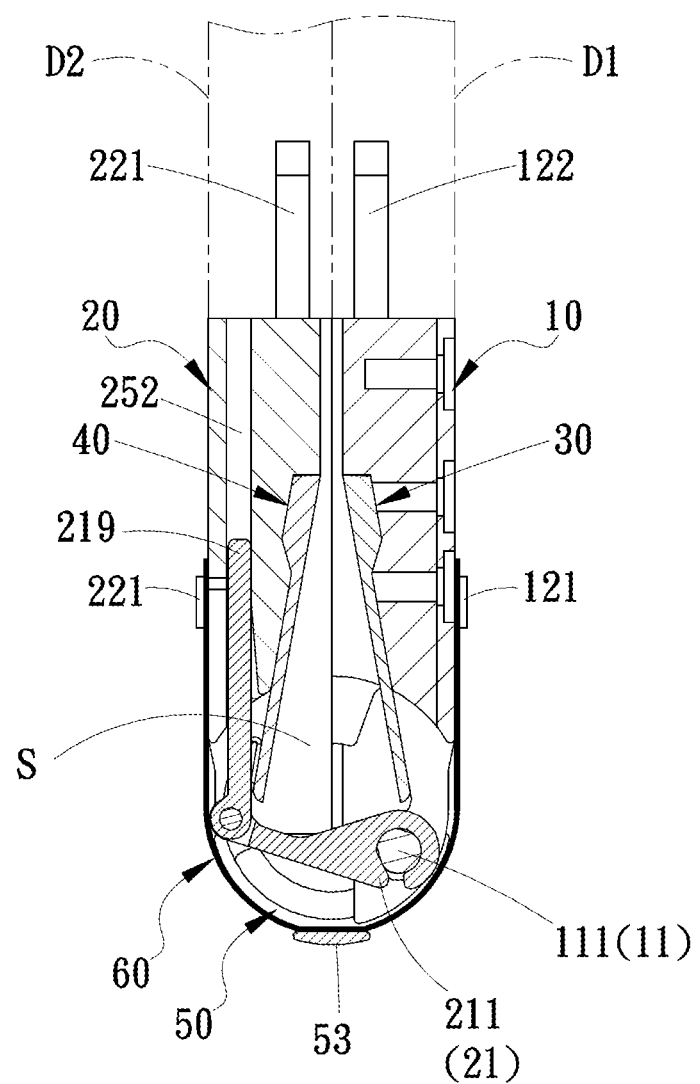
FIG. 5 is a schematic cross-sectional view showing the hinge device of FIG. 4 is folded.
Figure 6:
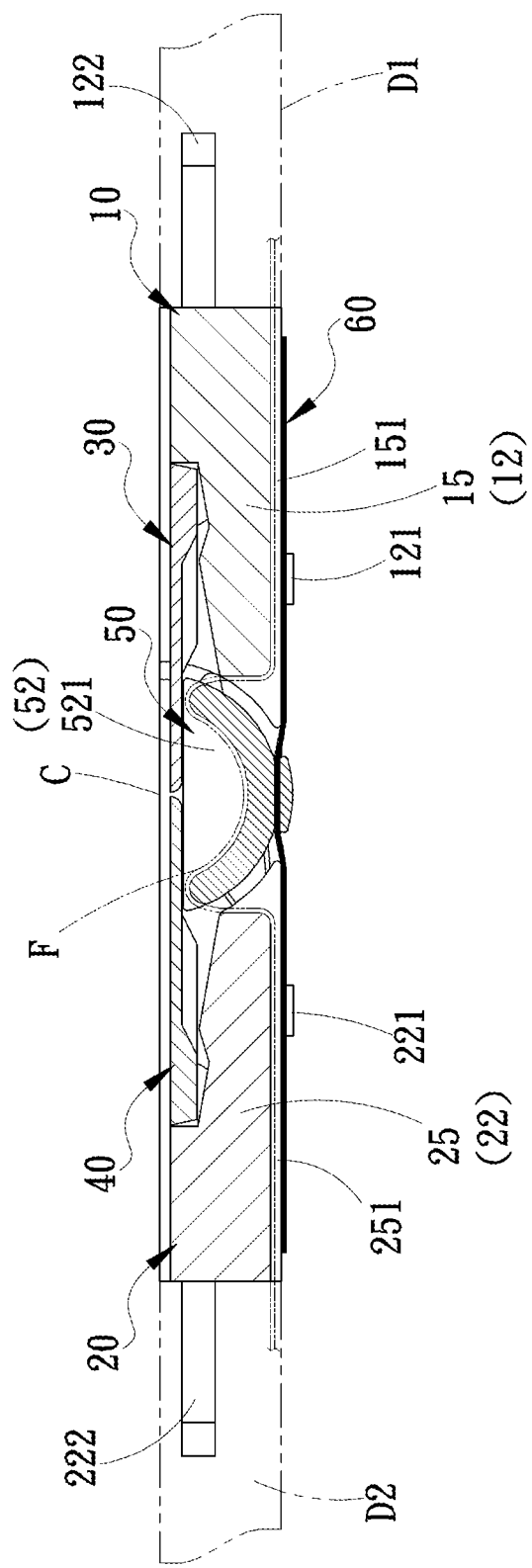
FIG. 6 is a cross-sectional view showing a portion through which lines are passed and in which the lines placed when the hinge device of the present invention is unfolded.
Figure 7:
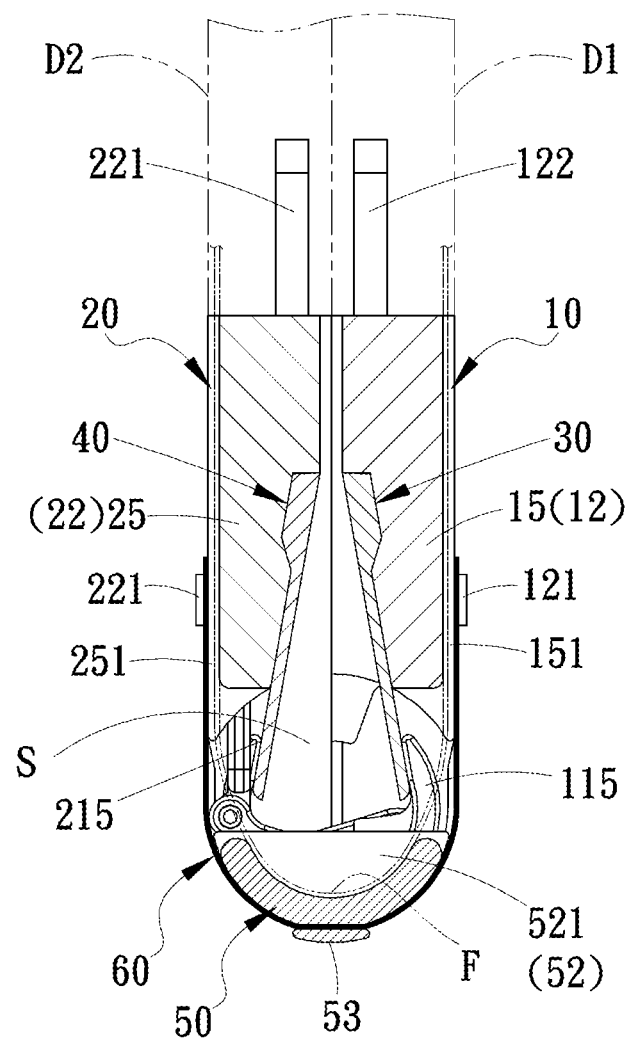
FIG. 7 is a schematic cross-sectional view showing the hinge device of FIG. 6 when being folded.
Figure 8:
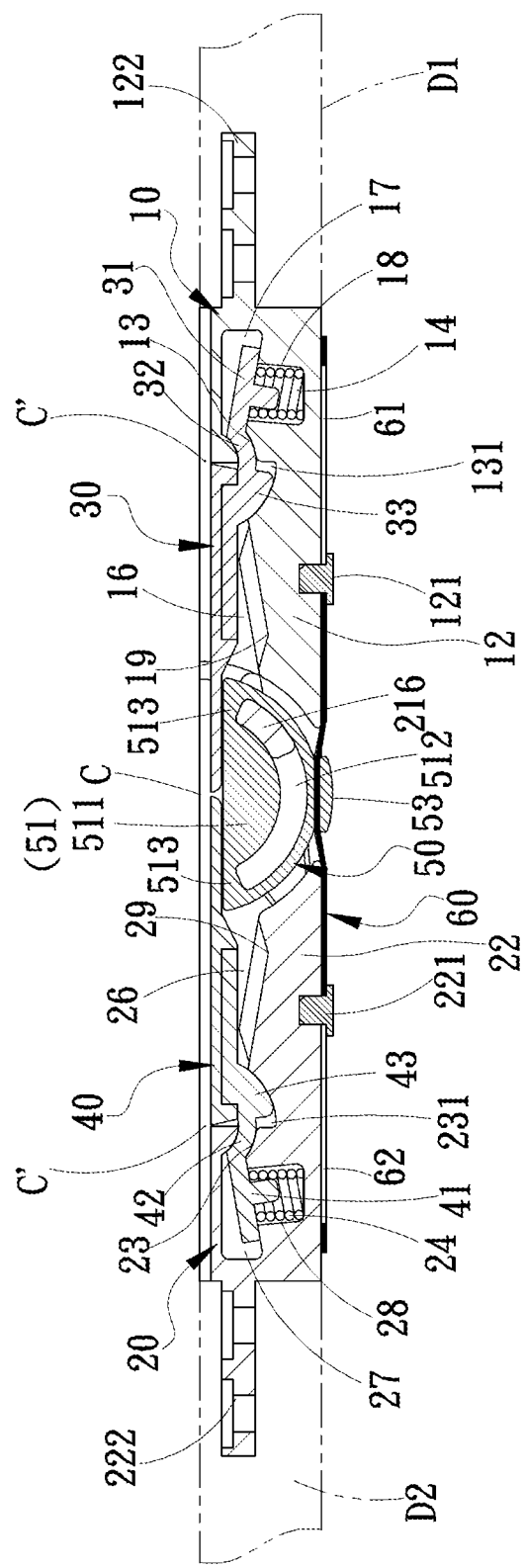
FIG. 8 is a cross-sectional view showing the elastic piece and the first and second seat bodies are unfolded in the hinge device of the present invention.
Figure 9:
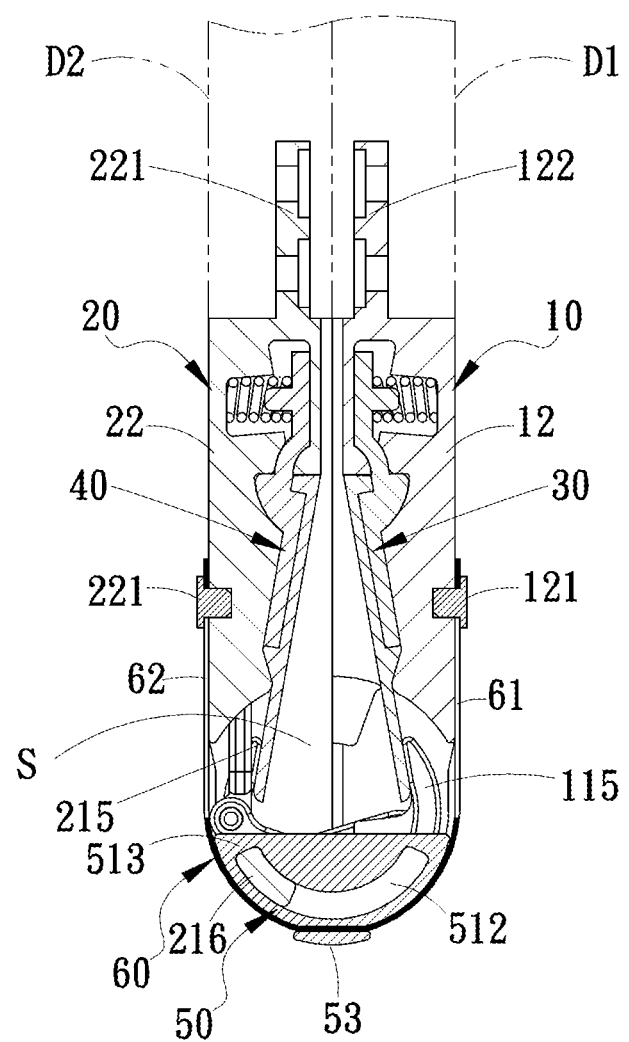
FIG. 9 is a cross-sectional view showing the hinge device of FIG. 8 when it is folded.
Figure 10:
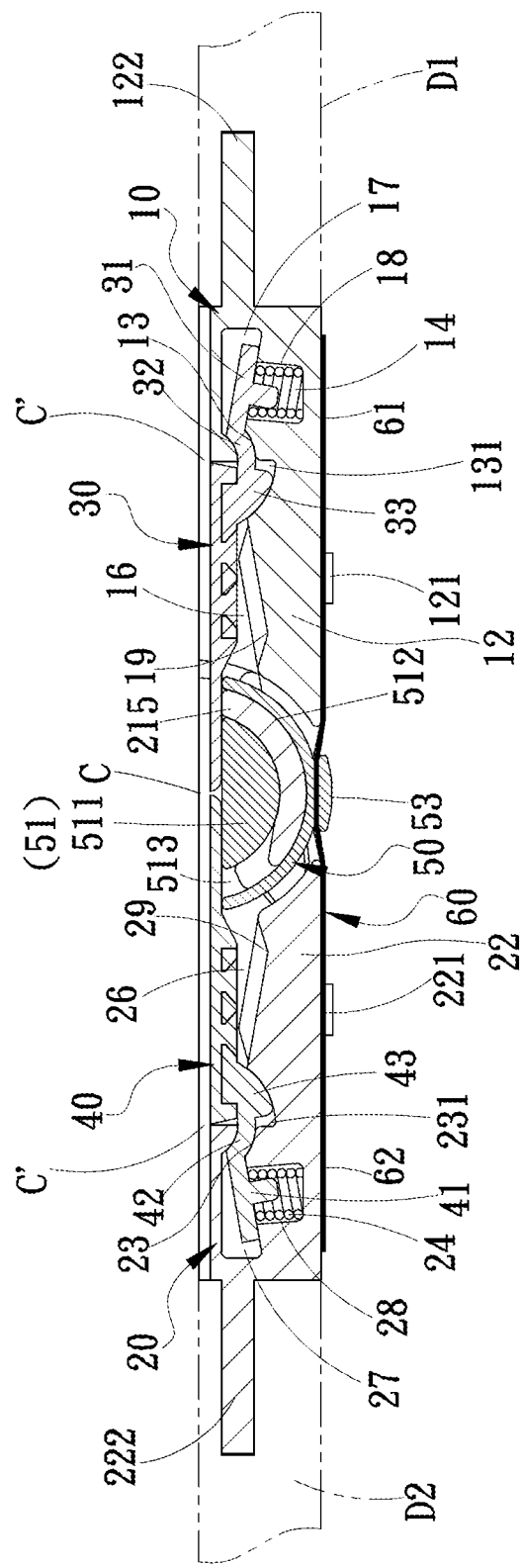
FIG. 10 is a cross-sectional view showing the third hinge portion and the first hinge portion/second hinge portion is unfolded in the hinge device of the present invention.
Figure 11:
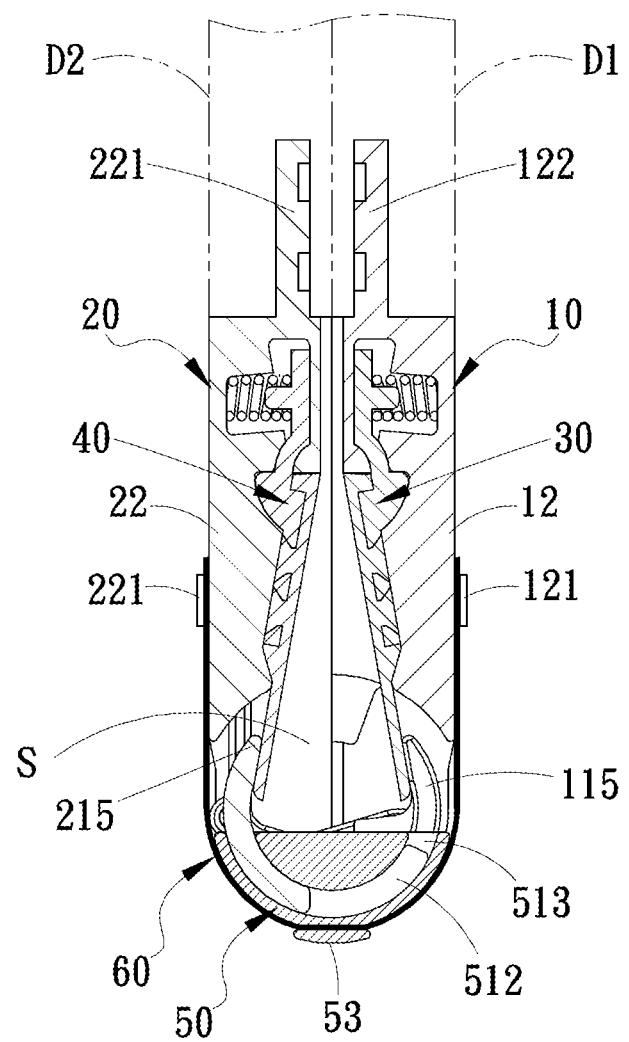
FIG. 11 is a cross-sectional view showing the hinge device of FIG. 10 is folded.
Figure 12:
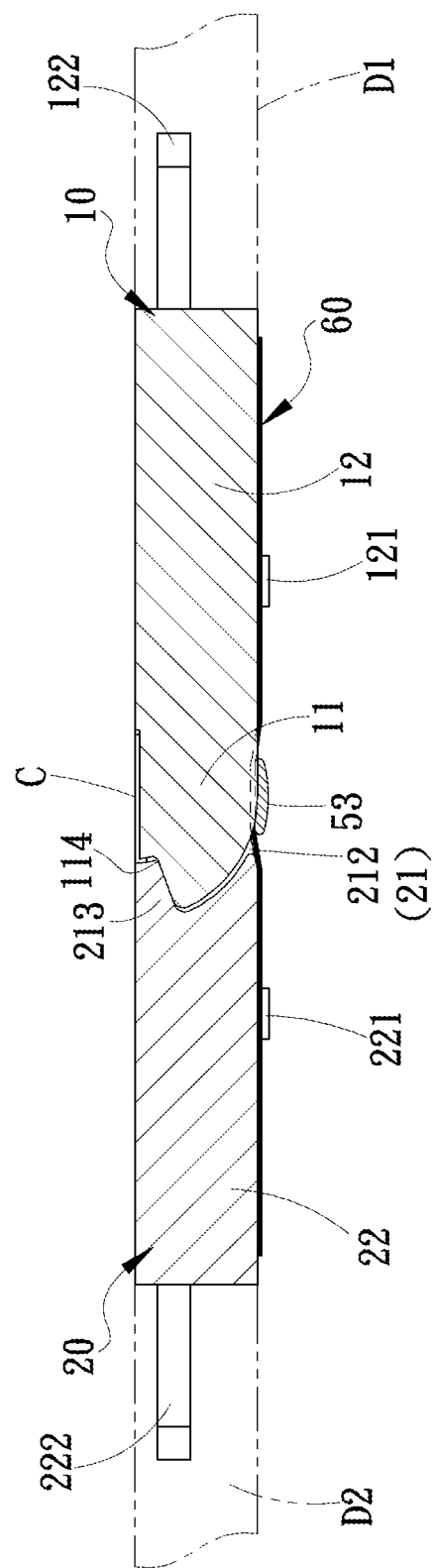
FIG. 12 is a cross-sectional view showing the first hinge portion and the second hinge portion are unfolded in the hinge device of the present invention.
Figure 13:
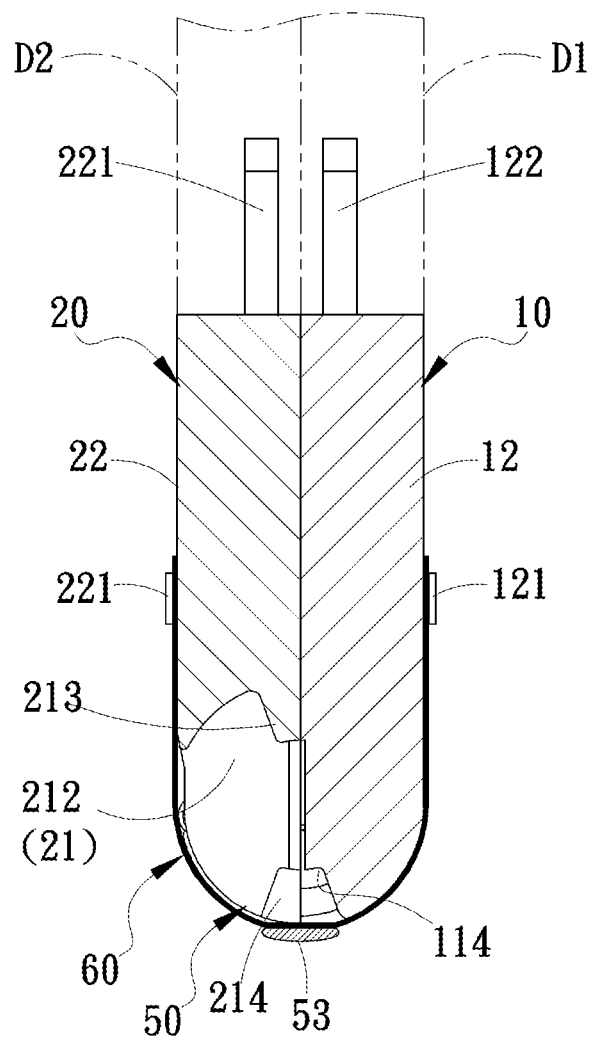
FIG. 13 is a cross-sectional view showing the hinge device of FIG. 12 that is folded.
Figure 14:
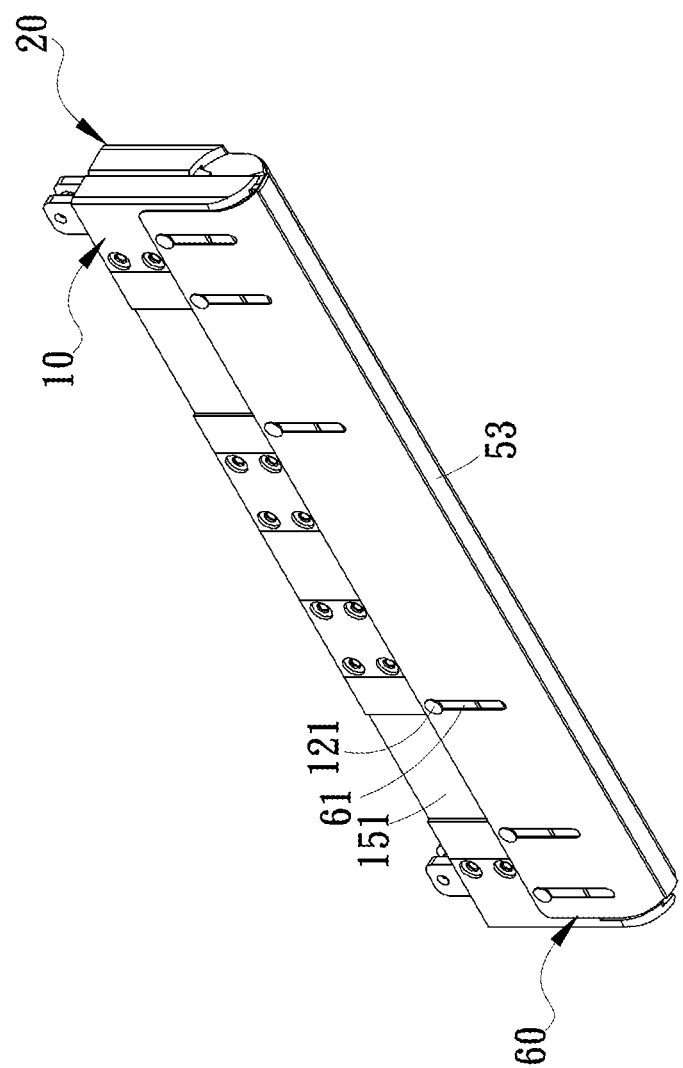
FIG. 14 is a perspective view showing the hinge device of the present invention that is folded.
Figure 15:
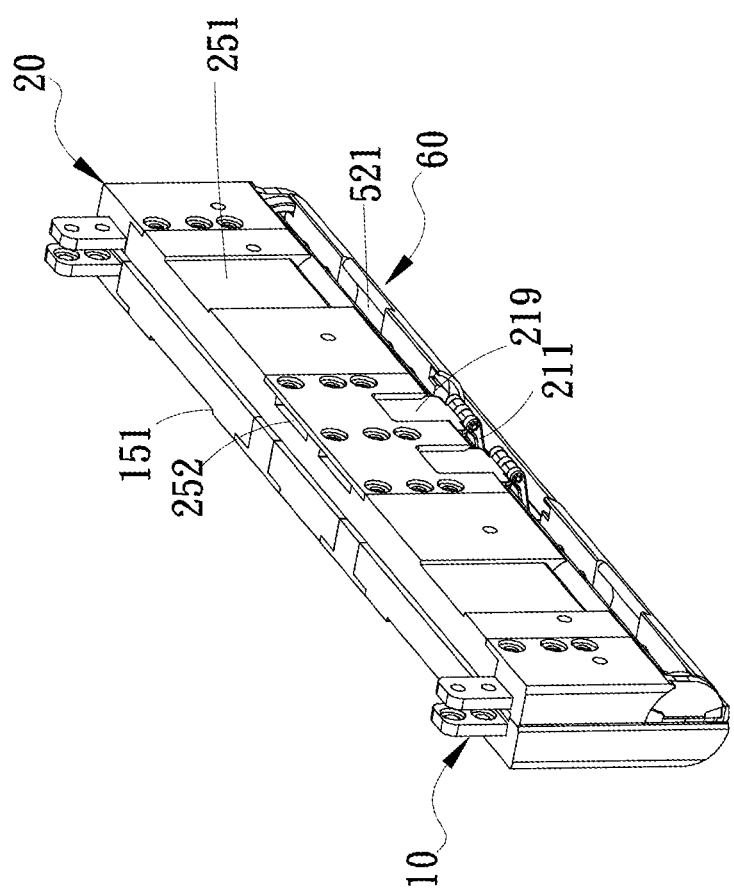
FIG. 15 is a perspective view showing the hinge device of the present invention that is folded without the elastic piece.

Referring to FIG. 1 to FIG. 15, the present invention discloses a hinge device, comprising a first rotating member 10, a second rotating member 20, and a first movable plate 30 and a second movable plate 40 symmetrically provided. The first rotating member 10 includes a first hinge portion 11 and a first seat body 12, and the first curved guiding channel 13 and the first restoring member 14 are provided in the first seat body 10. The second rotating member 20 includes a second hinge portion 21 and a second seat body 22, and the second hinge portion 21 and the first hinge portion 11 share an (external) rotating center C so as to be rotated with each other, thereby the two rotating members are folded or unfolded. The second curved guiding channel 23 and the second restoring member 24 are provided in the second seat body 22. The first movable plate 30 and the second movable plate 40 are respectively provided with a first plate leg 31 and a second plate leg 41, and these plate legs both have arc segments 32, 42 and one end thereof is a free end; wherein the free end of the first plate leg 31 is guided into the first seat body 12 to contact to the first restoring member 14, and the arc segment 32 of the first plate leg 31 is located on the first curved guiding channel 13 to move. The free end of the second plate leg 41 is guided into the second seat body 22 to contact to the second restoring member 24, and the arc segment 42 of the second plate leg 41 is located on the second curved guiding channel 23 to move; thereby when the first and second rotating members 10, 20 are rotated to be unfolded, the first movable plate 30 and the second movable plate 40 are lifted up respectively to be aligned with each other by the second hinge portion 21 and the first hinge portion 11, and the first restoring member 14 and the second restoring member 24 are respectively pushed by the first and third plate legs 31 and 42 to accumulate force. When the two rotating members are rotated to be folded, the partial (local) portion of the first hinge portion 11 and the partial (local) portion of the second hinge portion 21 are respectively separated from one end of the second movable plate 40 and the one end of the first movable plate 30 to release the first restoring member 14 and the second restoring member 24 so as to respectively push the first plate leg 31 and the second plate leg 41 to move, thereby causing the first and second movable panels 30, 40 be open to form an accommodation space S between each other.

In the above description, the hinge portion of the two rotating members is formed in a semicircular or in a bow shape and are connected by a shaft connection to share the same (external) rotating center C instead of the conventional two-axes, which helps to reduce the overall thickness so as to be in a thin-shape. On the other hand, in order to make hinge portion of each rotating member and the thickness of the seat body uniform, that is, to make the top side surface/bottom side surface of each part as aligned as possible and to achieve the effect of reducing the thickness, it is necessary to avoid each of the movable plate and plate leg thereof to be pivoted conventionally by using shafts or pins, so that a curved guiding path is provided in these seat bodies of the two rotating members, and the plate leg of the two movable plates are designed with an arc segment. Since each arc guiding channel and each arc segment also share another (external) rotating center C', each movable plate can also be swung when the arc segment of each moving plate leg slides along the curved guiding channel of each rotating member. Moreover, the half portion of the first hinge portion 11 is contacted with one end portion of the second movable plate 40, and the half portion of the second hinge portion 21 is contacted with one end portion of the first movable plate 30, such that when being unfolded, the two movable plates can be lifted up to be aligned with each other respectively by the second hinge portion and the first hinge portion, and the two restoring members are respectively pushed through the respective plate legs to accumulate force (compressing spring shown in the figure); when being folded, the hinge portions of the two movable members respectively separate from the two movable plates to release the two restoring members respectively to push the two plate legs to move, thereby causing the two movable plates to open and form an accommodating space S between each other, thereby replacing the conventional pivoting way of using shaft and pin Regarding the connection between each movable plate and its plate leg, it can be selected as one-piece manufacturing or detachable structural design depending on the condition of actual implementation.

In the first seat body 12, a first movable space 16 and a first movable chamber 17 are respectively formed at both ends of the first curved guiding channel 13, and the first movable space 16, the first curved guiding channel 13 and the first movable chamber 17 are communicated, and in which the first movable space 16 and the first movable chamber 17 are in a fan shape or in a gradually-changing shape (both gradually expanding outward from one end of the first curved guiding channel 13) and are symmetrically provided, so that the free end of the first plate leg 31 can be sequentially guided. Further, the first movable chamber 17 is further communicated with a first positioning chamber 18 for storing the first restoring member 14, such that when the arc segment 32 of the first plate leg 31 slides along the first curved guiding channel 13, the first movable plate 30 and the free end of the first plate leg 31 respectively swing between the first movable space 16 and the first movable chamber 17 respectively. Further, the first curved guiding channel 13 further has a first arc limiting groove 131 that is radially provided to be formed in the first movable space 16, and the connection portion of the arc segment 32 of the first plate leg 31 and the first movable plate 30 forms a first arc protruding portion 33 so as to form a stop effect with the first arc limiting groove 131, which also shares the load and limits the sliding range. Moreover, a first accommodating groove 19 is further provided radially in the first movable space 16 to be abutted with the first movable plate 30, such that the space vacated by the first movable plate 30 forms half of the accommodating space S.

In the second body 22 portion, a second movable space 26 and a second movable chamber 27 are respectively formed at both ends of the second curved guiding channel 23, and the second movable space 26, the second curved guiding channel 23 and the second movable chamber 27 are communicated, and in which the second movable space 26 and the second movable chamber 27 are in fan shape or in gradually-changing shape (both gradually expanding outward from one end of the second curved guiding channel 23) and are symmetrically provided, so that the free end of the second plate legs 41 can be sequentially guided. Further, the second movable chamber 27 is further communicated with a second positioning chamber 28 for storing the second restoring member 24, such that when the arc segment 42 of the second plate leg 41 slides along the second curved guiding channel 23, the second movable plate 40 and the free end of the second plate leg 41 respectively are swung between the second movable space 26 and the second movable chamber 27 respectively. Further, the second curved guiding channel 23 further has a second arc limiting groove 231 radially provided to be formed in the second movable space 26, and the connection of the arc segment 42 of the second plate leg 41 and the second movable plate 40 forms a second arc protruding portion 43 to perform a stop function with the second arc limiting groove 231, which also share the load and limit the sliding range. Moreover, a second accommodating groove 29 is further provided radially in the second movable space 26 to be abutted with the second movable plate 40, such that the space vacated by the second movable plate 40 forms another half of the accommodating space S.

Secondly, in order to protect the internal line(s) F (such as a wire, a signal line or a flexible circuit board) and components, and to have a shielding effect, the hinge device of the present invention further includes an elastic piece 60, and the elastic piece 60 is provided with at least one first guiding hole 61 and at least one second guiding hole 62 in a way with intervals. The first seat body 12 of the first rotating member 10 has a wall surface and is correspondingly provided with at least one first positioning portion 121 for throughout the at least one first guiding hole 61. The second seat body 22 of the second rotating member 20 has a wall surface and is correspondingly provided with at least one second positioning portion 221 for throughout the at least one second guiding hole 62, thereby the elastic piece 60 is respectively connected to the two seat bodies. Preferably, the at least one first guiding hole 61 is aligned with the at least one second guiding hole 62 to be located on the same path, which helps to apply force evenly. Further, a first extending portion 15 is provided axially on the first seat body 12, and the first extending portion 15 is provided with a first radial through channel 151, and the second seat body 22 is axially provided with a second extending portion 25, and the second extending portion 25 is provided with a second radial through channel 251 to be aligned in the same path with the first radial through channel 151 to accommodate and collect lines F and for the lines F to pass, thereby the positioning portion and the radial channel of the wall surface of each seat body are provided in a way of stagger arrangement to avoid mutual interference.

Furthermore, in order to avoid force concentrating on a single component, the present invention separates the stop structure from the torsion structure to share the load. Thus, in one embodiment of the present invention, as shown in figures, two first rotating members 10 and the first extending portion 15 between the first rotating members 10 are considered as one component, so that a first hinge portion 11 is respectively extended at opposite two axial side ends of the first rotating member 10, thereby the stop structure is located on one axial side of one of the first hinge portions 11 and the torsion structure is located on the opposite axial side of the another first hinge portion 11. Therefore, the two second rotating members 20 and the second extending portion 25 between two second rotating members 20 can be regarded as one component, and a second hinge portion 21 is respectively extended at the opposite two axial ends of the second rotating member 21, such that the stop structure is located on an opposite axial side of one of the second hinge portions 21 so as to butt the stop structure at the axial side of the first hinge portion 11, and the torsion structure is located at axial side of another second hinge portion 11 so as to butt a torsion structure at the opposite axial side of the first hinge portion 11, and the detailed structural features are described below.

As described in the above paragraph, regarding the torsion structure, the first hinge portion 11 includes a shaft 111 that is axially eccentric, and the second hinge portion 21 includes a sleeve 211 that is axially eccentric for pivoting the shaft 111. The sleeve 211 also has a radial opening to gradually increase or decrease the frictional torque during the forward or reverse rotation with respect to the shaft 111, such that the shaft 111 and the sleeve 211 generates a torque change, but in order to together with the reduction of volume and thickness, the rotating center shared by the shaft 111 and the sleeve 211 is eccentrically set (i.e., deviated from the common rotating center C of each rotating member) and is not regarded as the basis for the relative rotation of each rotating member, thereby it continuously provides the supporting torque during the relative rotation of each rotating member, so as to facilitate free stagnation. A slider 219 is pivotally connected to the radial end of the sleeve 211, and the slider 219 is guided into the sliding groove 252 of the second seat body 22 to move; thereby during the rotation of these two rotating members, for example, when from being unfolded to being folded, the shaft 111 rotates and travels on the circumferential path so as to increase displacement, and the slider 219 is required to to slide along the sliding groove 252 as a accommodation to stabilize the rotating. On the contrary, when from being folded to be unfolded, the shaft 111 decreases displacement as rotating, and the slider 219 is pushed through the sleeve 211 to slide along the sliding groove 252, so the rotation can be stably performed, thereby the slider 219 can assist the displacement of the sleeve 211. On the other hand, the first seat body 12 can be further axially provided with the first extending portion 15 and the first radial through channel 151, and the second seat body 22 can be further axially provided with the second extending portion 25 and a second radial through channel 251. The two radial through channels can be located on the same path as described in above paragraph to produce the same effect, and the difference is that the sliding groove 252 is provided at the second extending portion 25 to parallel to the two radial through channels and is also provided in a way of staggered arrangement to avoid mutual interference.

As described the above paragraph, regarding the stop structure, the first hinge portion 11 includes a first arc groove 112 that is axially open and in a stepped shape, and the opposite two ends of the groove are respectively provided with a limit block 113 and a limit groove 114. The second hinge portion 21 includes a second arc groove 212 that is axially open and stepped shape, and the opposite two ends of the groove are respectively provided with a limit block 213 and a limit groove 214, thereby corresponding to the limit groove 114 and the limit block 113 of the first arc groove 112, so as to have the structural shape of the second arc groove 212 correspond to that of the first arc groove 112. Therefore, when the two rotating members are rotated to be unfolded, the limit block 113 and the limit groove 114 of the first arc groove 112 and the limit groove 214 and the limit block 213 of the second arc groove 212 are respectively stopped each other, so that the first hinge portion 11 is combined on the second hinge portion 21, which contributes to the formation of a thin structure here.

In addition, in order to further enhance the auxiliary action to increase the stability of the rotating motion and to increase the axial width to promote the applicable range of the flexible display device, the hinge device of the present invention further includes a third rotating member 50, and the third rotating member 50 includes a third hinge portion 51 and a third seat body 52. The third seat body 52 is axially provided, both the third hinge portion 51 and the second hinge portion 21, or both the third hinge portion 51 and the first hinge portion 11 all share an (external) rotating center C to rotate, so as to stabilize the rotation of the first and second rotating members 10, 20; wherein the third hinge portion 51 includes a convex axis 511 and a curved concave groove 512 that are axially provided and coaxial, and the corresponding second hinge portion 21 or the first hinge portion 11 includes curved ribs 215, 115 that axially extend. One end of the curved ribs 215, 115 is used to increase the structural strength of each hinge portion to assist each hinge portion to lift up each movable plate, and the opposite ends of the curved ribs 215, 115 are gradually-converged shape to facilitate the guide of the curved concave groove 512 and to provide support when it is folded, so as to assist the respective rotating members 20, 10 to be abutted with the corresponding movable plates 40, 30. Stopping block 513, 216, 116 that can stop each other are also provided in the groove of the curved concave groove 512 and at one axial side of the curved ribs 215, 115, which are used for assisting the first and second hinge portions to stop each other in order to share the load.

As described the above paragraph, the third seat body 52 has a bottom surface including a middle part provided with a fixing rob 53, and at least one positioning hole 63 is further provided in the middle of the elastic piece 60 for at least one connecting column 531 of the fixing rod 52 to correspondingly throughout thereof provided. The elastic piece 60 is positioned between the third seat body 52 and the fixing rod 53 to prevent the elastic piece 60 from being loosened easily. On the other hand, in order to make the length of the line F sufficient to respond to the rotation of each of the rotating members to avoid being pulled strongly or even being torn. Please refer to the figures of the present invention, the first seat body 12 is axially provided with a first extending portion 15, the first extending portion 15 has a bottom surface and the bottom surface is concavely provided with a first radial through channel 151, and the second seat body 22 is axially provided with a second extending portion 25, the second extending portion 25 has a bottom surface and the bottom surface is concavely provided with a second radial through channel 251 to be located on the same path as the first radial through channel 151. The third seat body 52 has a top surface and the top surface is concavely provided with an arc groove 521, so that the two radial through channels 151, 251 and the arc groove 521 are used for accommodating and collecting the line F and for the line F to pass. For example, when the line F is provided, after the line F passes through the first radial through channel 151, the line F will be further detour into the arc groove 521 of the third seat body 52 and is provided along the wall surface of the arc groove 521 to the opposite side of the arc groove 521 and is passed out, and then is passed through the second radial through channel 251, so as to extend the service life of the line F.

In the hinge device of the present invention, a first connecting portion 122 is provided at a radial end of the first seat body 12, so that the first hinge portion 11 is located at the opposite radial side of the first seat body 12. A second connecting portion 222 is provided at one end of the second seat body 22, so that the second hinge portion 21 is located at the opposite radial end of the second seat body 22, and the two connecting portions 122, 222 are further connected to a body D1, D2, so that the two bodies D1, D2 can be rotated relatively with the two rotating members 10, 20 to be folded or unfolded for the flexible display device to be placed on the same side of the two rotating members 10, 20 and the two bodies D1, D2. Since the (external) rotation center C is shared by each rotating members, another (external) rotation center C' shared by each arc guiding channel and each arc segment are located on the same plane of the flexible display device, the flexible display device is protected to extend the service life during the transition from folded state to unfolded state, and the axial side walls of the first and second rotating members can also be used as frames for the flexible display device, which also has the effect of positioning and protection. On the other hand, the hinge device of the present invention can provide two or more modularized first rotating member 10, the second rotating member 20 and the third rotating member 50, for example, as shown in the figures, so as to greatly expand the axial width and increasing the range of application of the flexible display device, as well as flexibility in use of the same.

Accordingly, the present invention has the following advantages:
1. The rotating shaft device of the present invention can reduce number of the components and the assembly process, thereby the overall thickness is reduced so as to replace the pivotal connection of the one end portion of the conventional rotating plate/support member by means of the arc legs of the movable plate together with the curved guiding channel inside the rotating member. The curved portion of the flexible display device would have smaller curvature when the flexible display device is folded in half by using two or three rotating members in a semi-circular/arched shape and each rotating member shares the same external rotating center to replace the conventional two-axis rotating shaft/hinge. Moreover, when being unfolded, the flexible display device is unfolded by lifting each movable plate through the shaft portions of each rotating member.
2. The hinge device of the present invention further protects internal wiring and components by means of providing elastic sheets on the same side of the three rotating members. When the rotating members are rotated, in addition to supporting the internal wires and for the same to pass, the present invention can also protect the movement between other components (such as the sleeve and slider pivoting the sleeve) and has a shielding effect to prevent foreign material from entering in and have an aesthetic effect by way of positioning the middle portion of the elastic piece in the middle one of the rotating members, and respectively connecting the opposite end portions of the elastic piece to the other two of the rotating members in a sliding manner
3. The hinge device of the present invention is provided the stop structure and the torsion structure separately. The stop structure is distributed on the shaft portions of the three rotating members to share the load and assist in supporting the flexible display device. The torsion structure is applied by set a spindle of the first rotating member together with a sleeve and a slider of the second rotating member, so as to form a continuous supporting effect during the rotation of the each rotating member, and the provided torque is able to stably increase or reduce gradually to avoid sudden failure.

The description referred to in the drawings and stated above is only for the preferred embodiments of the present invention. Many equivalent variations and modifications can still be made by those skilled at the field related with the present invention and do not depart from the spirit of the present invention, so they should be regarded to fall into the scope defined by the appended claims. To sum up, the hinge device of the present invention can indeed meet its anticipated object and can be applied to the currently available relative device, which is highly applicable to all kinds of industry.

What is claimed is:
1. A hinge device comprising:
a first rotating member, comprising a first hinge portion and a first seat body provided with a first curved guiding channel and a first restoring member;
a second rotating member, comprising a second hinge portion and a second seat body, wherein the second hinge portion and the first hinge portion share a rotating center so as to be rotated with each other, thereby the first and second rotating members are folded or unfolded, wherein a second curved guiding channel and a second restoring member are provided in the second seat body; and
a first movable plate and a second movable plate that are symmetrically provided, where the first movable plate and the second movable plate are respectively provided with a first plate leg and a second plate leg, each of the first and second plate legs has an arc segment and has one end as a free end; wherein the free end of the first plate leg is guided into the first seat body to be contacted with the first restoring member, and the arc segment of the first plate leg is located in the first curved guiding channel to be moved; the free end of the second plate leg is guided into the second seat body to be contacted with the second restoring member, and the arc segment of the second plate leg is located in the second curved guiding channel to be moved;
thereby, when being unfolded, the two movable plates are respectively lifted up to be aligned with each other by the second hinge portion and the first hinge portion, and the two restoring members are respectively pushed by the respective plate legs to accumulate force; when being unfolded, the hinge portions of the two rotating members are respectively separated from the two movable plates to release the two restoring members to push the two plate legs to move respectively, causing the two movable plates to be unfolded and form an accommodation space there between.

2. The hinge device according to claim 1, further comprising an elastic piece provided with at least one first guiding hole and at least one second guiding hole spaced from each other, wherein the first seat body of the first rotating member has a wall surface and is further correspondingly provided with at least one first positioning portion being inserted into the at least one first guiding hole, and the second seat body of the second rotating member has a wall surface and is further provided with at least one second positioning portion being inserted into the at least one second guiding hole to connect the elastic piece to the two seat bodies respectively.

3. The hinge device according to claim 2, wherein the first seat body is axially provided with a first extending portion, the first extending portion is provided with a first radial through channel, and the second seat body is axially provided with a second extending portion, the second extending portion is provided with a second radial through channel that is aligned in the same path with the first radial through channel to accommodate and collect lines and for the lines to pass.

4. The hinge device according to claim 2, further comprising a third rotating member, including a third hinge portion and a third seat body, wherein the third seat body is provided axially, and the third hinge portion and the second hinge portion or the first hinge portion share a rotating center so as to be rotated with each other, so as to stabilize the rotation of the first and second rotating members.

5. The hinge device according to claim 4, wherein the third hinge portion includes a convex axis and a curved concave groove that are axially provided and coaxial, and the corresponding second hinge portion or first hinge portion includes a curved rib that axially extends, and stop blocks that are able to stop each other are further provided in the curved concave groove and on one side of the curved rib.

6. The hinge device according to claim 4, wherein the third seat body has a bottom surface including a middle part provided with a fixing rod, and at least one positioning hole is provided in the middle of the elastic piece for at least one connecting column of the fixing rod to be correspondingly inserted therein, thereby the elastic piece is positioned between the third seat body and the fixing rod.

7. The hinge device according to claim 4, wherein the first seat body is axially provided with a first extending portion, the first extending portion has a bottom surface and is concavely provided with a first radial through channel, and the second seat body is axially provided with a second extending portion, the second extending portion has a bottom surface and is concavely provided with a second radial through channel that is in the same path with the first radial through channel, and the third seat body has a top surface and is concavely provided with a arc groove, thereby the two radial through channels and the arc groove contain and collect lines and for the lines to pass.

8. The hinge device according to claim 1, wherein the first seat body is axially provided with a first extending portion, the first extending portion is provided with a first radial through channel, and the second seat body is axially provided with a second extending portion, the second extending portion is provided with a second radial through channel that is aligned in the same path with the first radial through channel to accommodate and collect lines and for the lines to pass.

9. The hinge device according to claim 1, wherein the first hinge portion includes a shaft that is axially eccentrically provided; the second hinge portion includes a sleeve that is axially eccentrically provided for pivoting the shaft, and the sleeve is provided pivotally with a slider at its radial end, and the slider is guided into a sliding groove of the second seat body to move relatively.

10. The hinge device according to claim 9, wherein the first seat body is axially provided with a first extending portion, the first extending portion is provided with a first radial through channel, and the second seat body is axially provided with a second extending portion, the second extending portion is provided with a second radial through channel that is aligned in the same path with the first radial through channel to accommodate and collect lines and for the lines to pass, and the sliding groove is provided on the second extending portion to be parallel to the two radial through channels.

11. The hinge device according to claim 1, wherein the first hinge portion includes a first arc groove that is axially open and in a stepped shape, and the opposite ends of the first arc groove are respectively provided with a limiting block and a limiting groove; the second hinge portion includes a second arc groove that is axially open and in a stepped shape, and the opposite ends of the second arc groove are respectively provided with a limiting block and a limiting groove that are corresponding to the limiting groove and the limiting block of the first arc groove, thereby when being unfolded, the limiting block and the limiting groove of the first arc groove are respectively stopped by the limiting groove and the limiting block of the second arc groove.

12. The hinge device according to claim 1, further comprising a third rotating member, including a third hinge portion and a third seat body, wherein the third seat body is provided axially, and the third hinge portion and the second hinge portion or the first hinge portion share a rotating center so as to be rotated with each other, so as to stabilize the rotation of the first and second rotating members.

13. The hinge device according to claim 1, wherein the first seat body further respectively is provided with a first movable space and a first movable chamber at two ends of the first curved guiding channel, and the first movable space and the first movable chamber are in communication, and the first movable chamber further communicates with a first positioning chamber for storing the first restoring member, so that during the relative sliding of the arc segment of the first plate leg along the first curved guiding channel, the first movable plate and the free end of the first plate leg respectively are swung between the first movable space and the first movable chamber.

14. The hinge device according to claim 13, wherein the first curved guiding channel further has a first arc limiting groove that is radially provided to be formed in the first movable space, the location where the arc segment of the first plate leg and the first movable plate forms a first arc protruding portion so as to provide a stopping effect with the first arc limiting groove, and a first accommodating groove is further radially provided in the first movable space to be abutted with the first movable plate.

15. The hinge device according to claim 1, wherein the second seat body is further formed a second movable space and a second movable chamber at two ends of the second curved guiding channel, and the second movable space and the second movable chamber are in communication, and the second movable chamber further communicates with a second positioning chamber for storing the second restoring member, so that during the relative sliding of the arc segment of the second plate leg along the second curved guiding channel, the second movable plate and the free end of the second plate leg respectively are swung between the second movable space and the second movable chamber.

16. The hinge device according to claim 15, wherein the second curved guiding channel further has a second arc limiting groove that is radially provided to be formed in the second movable space, the location where the arc segment of the second plate leg and the second movable plate forms a second arc protruding portion to form a stopping effect with the second arc limiting grooves, and a second accommodating groove is further radially provided in the second movable space to be abutted with the second movable plate.

17. The hinge device according to claim 1, wherein one end of the first seat body is provided with a first connecting portion, and one end of the second seat body is provided with a second connecting portion, the first connecting portion and the second connecting portion are further connected to a body respectively to relatively rotate with the first and second rotating members to be folded or unfolded.

* * * * *